United States Patent [19]
Smitley

[11] 3,955,641
[45] May 11, 1976

[54] SAFETY SHUT-OFF FUEL SYSTEM

[75] Inventor: Marion L. Smitley, Birmingham, Mich.

[73] Assignee: Colt Industries Operating Corporation, New York, N.Y.

[22] Filed: June 6, 1975

[21] Appl. No.: 584,650

[52] U.S. Cl. .............................. 180/104; 137/39; 180/82 R
[51] Int. Cl.² .................................. B60K 28/00
[58] Field of Search ............ 180/82 R, 103 BF, 104; 123/198 D, 198 DB; 137/38, 39

[56] References Cited
UNITED STATES PATENTS 3,059,661  10/1962  Benmore .............................. 137/39

*Primary Examiner*—M. H. Wood, Jr.
*Assistant Examiner*—Terrance L. Siemens

[57] ABSTRACT

An automotive fuel system which has a fuel tank, a fuel pump, a fuel metering device for metering fuel flow to an associated fuel-consuming engine, and a fuel reservoir, as, for example, a carburetor fuel bowl with a float controlled fuel inlet valve, has a spring urging the float in a direction which results in a closing of the fuel inlet valve even against relatively high fluid pressure heads tending to open said inlet valve as may occur when the associated vehicle experiences a crash impact or a roll-over condition so as to terminate further flow of fuel from the fuel tank into the fuel reservoir.

6 Claims, 5 Drawing Figures

SAFETY SHUT-OFF FUEL SYSTEM

BACKGROUND OF THE INVENTION

Generally, automotive vehicles, whether automobiles, trucks, buses or the like, have a relatively high degree of stability even in situations where they are struck from the side by another vehicle at a relatively high velocity. The stability and resistance to such struck vehicle turning over is due to such factors as the relatively heavy weight of the vehicle, its relatively low center of gravity as well as the relatively wide lateral wheel spacing. However, a very small percentage of such automotive vehicles involved in crashes do, nevertheless, turn or roll over or otherwise severely change their attitude from what would be considered normal.

It has, for many years, been accepted practice to, in automotive vehicles, provide a fuel tank from where a fuel pump would draw fuel and, in turn, supply such fuel to, for example, a fuel metering device on a remotely situated engine.

Often such fuel metering devices take the form of a carburetor with an associated fuel bowl including a float-valve assembly therein. In many such arrangements there is a vent passage which in effect serves to complete communication as between the interior of the fuel bowl (above the fuel contained therein) and a source of ambient atmosphere as, for example, some point or area within and downstream of the engine intake air cleaner.

Of the very small percentage of such automotive vehicles which do turn over, roll over or otherwise severely change their attitude, it has been found that a further small percentage thereof have had fuel spill out of the vent tube or passage (or other passages communicating with the engine intake system) and flow over the engine and associated structure. In such instances, after investigations, it has been determined that because of the particular physical attitude or position assumed by the struck vehicle the fuel tank may actually assume an elevation above that of the carburetor fuel bowl. Because of such a change in relative elevations the liquid pressure head of the fuel within the fuel tank becomes sufficient to cause fuel to flow through the fuel pump (even though the fuel pump may not be operating) and into the carburetor fuel bowl from where such fuel, as previously indicated, can spill over onto the engine and associated structure. Such fuel, from the fuel tank, continually spilling, can, in turn, under circumstances giving rise to such a condition, ignite with the resulting flames being capable of starting the entire vehicle to burn.

Even though the occurrence of such crash situations leading to such fuel-caused fires is rare, nevertheless, the invention as herein disclosed and described is directed to the solution of such as well as other attendant and related problems.

SUMMARY OF THE INVENTION

According to the invention, a fuel metering and supply system provided with an associated fuel reservoir having a float controlled fuel inlet valve has a spring biasing the float in a in inlet valve closing direction; the weight of the float is sufficient, in the absence of a buoyant force thereagainst, to overcome the biasing force of the spring when the associated vehicle is in a normal attitude, with the weight of the float becoming effectively removed from resisting the spring biasing force when the associated vehicle has assumed an abnormal attitude thereby terminating further fuel flow from said fuel tank to said fuel reservoir.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENT

Figure 1:
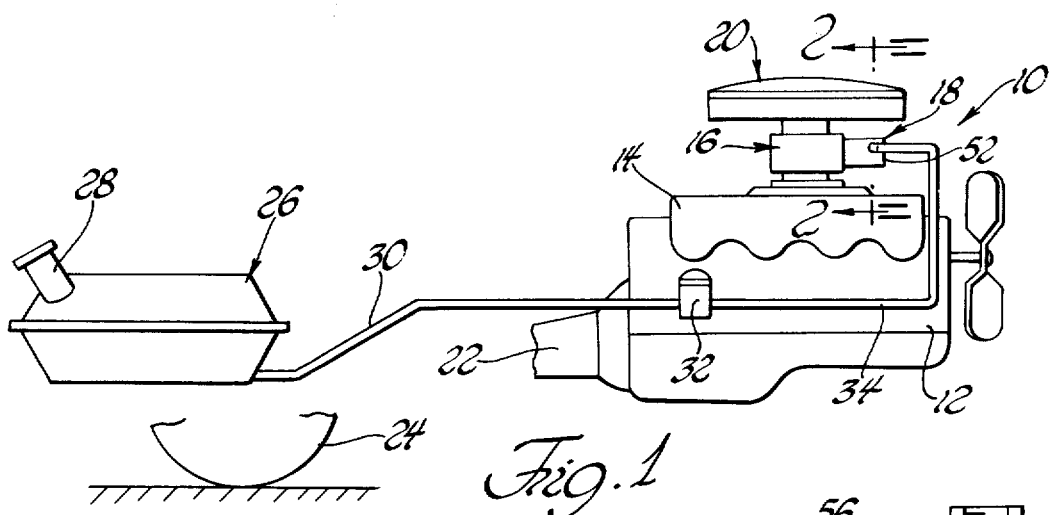
FIG. 1 is a side elevational view depicting the general arrangement of an automotive fuel system employing the teachings of the invention and associated fuel consuming engine.

Referring now in greater detail to the drawings, FIG. 1 illustrates an automotive engine 10 as being comprised of an engine block or housing 12 with an intake manifold 14 and a fuel metering device 16 situated generally thereatop. For purposes of discussion, the fuel metering device 16 may be considered to be a carburetor with an associated fuel reservoir means or fuel bowl assembly 18 associated therewith. An air cleaner assembly 20 serves to filter the ambient air being supplied to the intake of the carburetor 16.

A power transmission assembly 22 may be employed for providing power to the vehicular ground-engaging drive wheels such as fragmentarily depicted at 24.

A fuel tank assembly 26, usually remotely situated with respect to the engine 10, is provided with a fuel filler pipe or tube 28 and has a fuel supply conduit means 30 leading from the tank assembly to the inlet or intake of a related fuel pump assembly 32. The fuel pump assembly may be of any type (many of which are very well known in the art) and may be driven electrically or mechanically as by a direct mechanical connection with the engine assembly 10.

The outlet or discharge of the fuel pump 32 has conduit means 34 leading from there to the inlet 36 of the fuel bowl assembly 18.

Figures 2, 3:
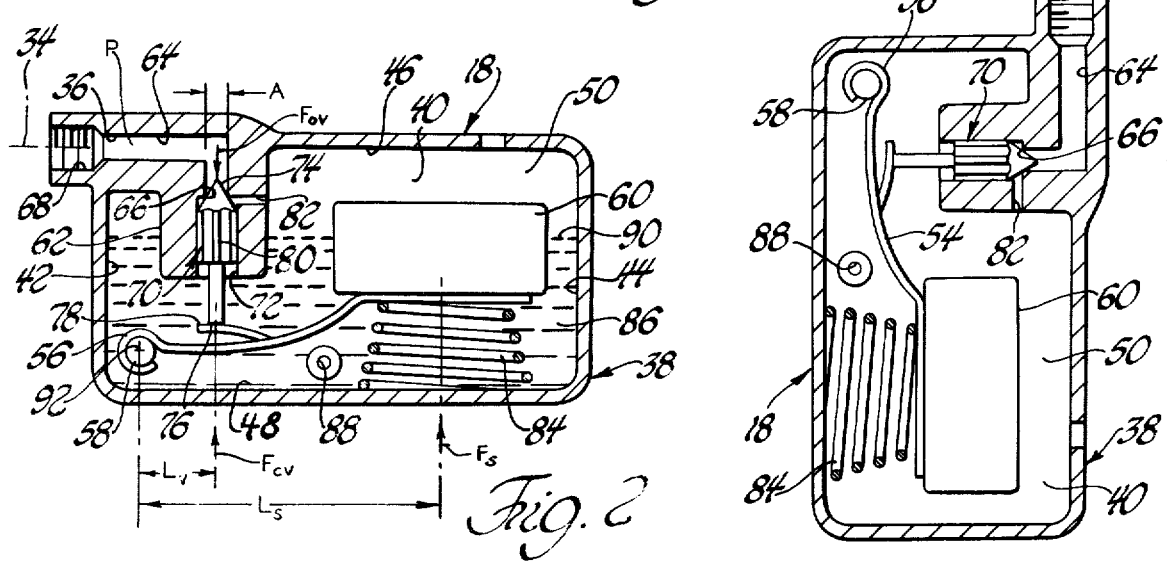
FIG. 2 is an enlarged cross-sectional view of a fuel reservoir, employing the teachings of the invention, taken generally on the plane of line 2—2 of FIG. 1 and looking in the direction of the arrows.
FIGS. 3, 4 and 5 are views similar to that of FIG. 2 but illustrating the structure in varying attitudes corresponding to selected abnormal attitudes of, for example, the associated vehicle.

As shown in FIG. 2, in somewhat simplified form for purposes of clarity, the fuel bowl assembly may be comprised of housing means 38 having a chamber 40 therein defined generally by side walls 42 and 44, upper and lower walls 46 and 48, a rear wall 50 and a forward or outer wall 52 (not shown in FIG. 2 but identified in FIG. 1).

A lever or arm member 54 has its one end 56 pivotally secured to related pivot means 58, carried as by, for example, wall 50.

A generally enlarged body-like portion 62 of the fuel bowl has conduit means 64 formed therein leading as from the inlet 36 to a discharge aperture defined generally by a circumscribing valve seat portion 66. As shown, conduit means 64 may also include associated threaded means 68 for threadably engaging and connecting the discharge end of conduit means 34 thereto.

An inlet valve 70, axially slidably received within a guide passage 72, has a valving surface 74 at its upper end adapted for cooperative engagement with valve seat means 66 to thereby determine and control the rate of fuel flow therebetween while the lower end 76 of valve 70 is in operative engagement with, for example, a tab or portion 78 of lever arm 54. As is well known in the art, the body of valve member 70 may have axially extending flatted surfaces 80 to thereby permit the flow of fuel between the valve body and passage 72 into chamber 40 whenever valve surface 74 is moved away from seat 66. Further, additional fuel passage means, such as at 82, may also be provided to enhance the ready flow of fuel to the chamber 40 whenever valve member 70 is opened.

Spring means 84 situated within chamber 40 serves to provide an upward biasing force against float 60.

Generally, as fuel 86 within chamber 40 is metered through related calibrated fuel metering means 88 in its flow to the engine 10, the level 90 of the fuel tends to decrease. Such decrease causes the float 60 to move downwardly against the resilient resistance of spring 84 and in so doing rotate float lever arm 54 clockwise about pivot 58. Such rotation of arm 54 enabled the corresponding downward movement of fuel inlet valve member 70 thereby to that attendant degree further opening the area for fuel flow between seat 66 and valve surface 74 as to increase the rate of such flow from conduit 64 to chamber 40 to maintain the desired fuel level 90.

In the prior art, the operation of the structure was generally as that set forth above. However, significant differences will become apparent upon further detailed description of the invention especially when considered to the prior art structures.

By way of background, the prior art has always taken steps to make the prior art float structure (corresponding to 60) as light in weight as practicable as to thereby be, during operation, almost totally dependent upon the buoyant force of the fuel (corresponding to 86) within the fuel bowl chamber (corresponding to 40) to maintain such float in its operative position. Further, in the prior art great care has been taken to employ very light spring means (corresponding to 84); that is, such corresponding prior art spring means have a very high spring rate and when in assembled condition a very low magnitude of preload. The purpose of such prior art spring means (corresponding to 84) was to provide a degree of damping and attendant stability to the associated float structure especially when the associated vehicle was traversing rough or bumpy roads. If the associated fuel metering means 16 and/or the associated vehicle assumed an abnormal attitude (as for example, the vehicle being tipped to position the fuel tank upper most and the fuel bowl assembly lowermost) the prior art structure would permit the fuel within the fuel tank to, in effect, force open the inlet valve (corresponding to 70) and flow into and through the fuel bowl chamber (corresponding to 40).

The invention as herein disclosed proposes doing exactly opposite to that taught by the prior art as being essential.

That is, the invention as herein disclosed proposes the use of a float structure 60 of relatively heavy weight and spring means 84 of relatively lower spring rate and of relatively great spring preload force. If not already so, it will become apparent that the actual values and/or magnitudes of, for example, weight, spring rate and spring preloads cannot be positively set forth herein since such valves would not necessarily be applicable to all structures which, obviously, because of physical dimensions and configurations may well require alterations of various dimensions and weight factors to achieve the same end result. However, once being taught the invention, as herein disclosed, it will be very apparent to those skilled in the art, as well as those even less than skilled in the art, as to how to determine the various factors involved as well as the ultimate application of the invention to whatever the related structure may be.

Now with additional detail to the drawings, it is apparent that the basic closing force applied to inlet valve 70 is primarily dependent on the weight of float 60, the buoyant force of the fuel or fluid 86, resulting from the displacement of such fluid by the float 60, and the preload force of spring means 84 as also modified by the spring rate of spring means 84. The effect of the lever arm 54 is, of course, merely a multiplication of whatever the valve of such basic closing force may be as determined by the factors set forth. In the preferred embodiment of the invention, and contrary to the teachings of the prior art, the degree to which the said buoyant force is employed, as an influencing factor, is maintained proportionately small with respect to the other force or weight factors involved. That is, the weight of the float 60 is significantly and substantially increased over that considered acceptable by the prior art while the spring rate of spring means 84 is decreased and the preload force of spring means is increased. The consequences of such unobvious changes over the prior art will better be appreciated if certain problems and corresponding solutions are assumed.

Let it be assumed that is desired to employ the teachings of the invention in order to have a structure, as, for example, that shown in FIG. 2 which would not permit flow of fuel from conduit means 64 past valve 70 and into and through chamber 40 even under the most theoretically possible adverse condition. Let it also be assumed that such an adverse condition would be one in which a vehicle equipped with a fuel metering device as 16 and which, in turn, is provided with a float regulated fuel reservoir assembly 18 experiences a crash condition whereby the front of the vehicle is lowermost and the rear of the vehicle is uppermost and that the fuel tank 26 is completely filled to thereby generate the greatest resulting static fluid pressure head against the effective area of inlet valve 70 when such valve 70 is in a closed condition with regard to valve seat means 66. With such an assumed crash condition, let it be assumed that FIG. 2 illustrates the then position of fuel bowl means 18 so that, in effect, the front of the crash vehicle would be below the plane of the drawing and the rear of the said crash vehicle would be above the plane of the drawing.

Still referring to FIG. 2, if the assumed pressure head is of a value, P, and the effective area of valve surface 74 is assumed to be, A, then there will be an available force of $F_{ov}$ tending to open valve member 70 and such force $F_{ov}$ is determined by:

$$F_{ov} = P \times A$$

In order to assure that valve member 70 will not open under that magnitude of $F_{ov}$, a valve closing force of $F_{cv}$ at least equal to $F_{ov}$ must be supplied to end 76 of valve 70. This closing force, as will become apparent, is, in effect, created solely by spring means 84. If, at the moment that valve member 70 is closed, the force of spring means 84 is assumed to be, $F_s$, the effective lever arm thereof is assumed to be, $L_s$, and the resulting valve closing force is, $F_{cv}$, while the effective lever arm is, $L_v$, then it can be seen that:

$$1\ F_s \times L_s = F_{cv} \times L_v$$

$$(2)\quad F_s = F_{cv} \times \frac{L_v}{L_s}$$

Since $F_{cv} = F_{ov}$, then:

$$(3)\quad F_s = F_{ov} \times \frac{L_v}{L_s}$$

Substituting for "$F_{ov}$":

$$(4)\quad F_s = P \times A \times \frac{L_v}{L_s}$$

Since A, $L_v$ and $L_s$ are all constants:

$$5\ F_s = P \times K$$

Therfore, if the value of $F_s$ is determined as above, the resulting structure will not permit fuel to drain from a filled fuel tank in the assumed crash position. It should also be apparent that in the assumed crash position of assembly 18, of FIG. 2, the buoyant force of whatever fluid may be in chamber 40 neither effectively adds to nor subtracts from either the value of $F_s$ or $F_{cv}$ because any such buoyant force would be at least generally parallel to the centerline 92 of pivot means 58. Further, it should be apparent that in such an assumed crash position the weight of float member 60 is not any significant contributing factor in determining the value of either $F_{cv}$ or $F_s$ since the direction of the force developed by such weight is, again, at least generally parallel to axis 92.

Now if it is assumed that the structure of FIG. 2 is depicted in a normal attitude, it can be seen that having thusly determined the value of $F_s$ (as hereinbefore described) the actual mass (weight and size) of float 60 as well as the spring rate of spring means can be readily determined so as to obtain the desired movement and/or sensitivity of float 60. Since the value of $F_s$ as described above is much greater than that employed by the prior art, it naturally follows that the magnitude of the weight of float 60 is also significantly increased.

Figures 4, 5:
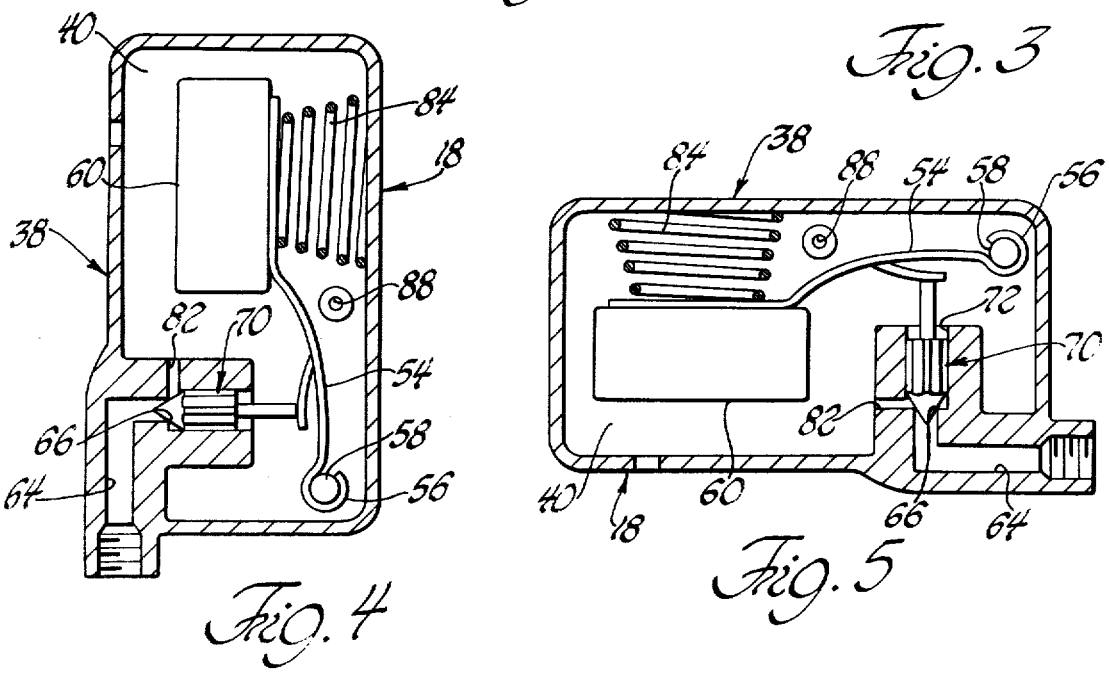

For purposes of illustration, FIGS. 3, 4 and 5 depict other selected abnormal attitudes which the invention could assume without permitting the draining of fuel from the fuel tank 26 into and through chamber 40. Other conceivable abnormal attitudes may, of course, be extrapolated from the positions depicted and if such is done it will be seen that in all such extrapolated positions the invention prevents the said draining of fuel.

The invention as illustrated in FIG. 3 depicts an abnormal attitude assumed, for example, by the associated vehicle being turned as to be lying on its left side; FIG. 4 depicts an abnormal attitude assumed, for example, by the associated vehicle being turned as to be lying on its right side; and FIG. 5 depicts an abnormal attitude assumed, for example, by the associated vehicle being turned-over as to be lying on its roof.

Referring to FIG. 3 it can be seen that again the weight created force of float 60 is not of a material or significant factor since it is mainly directed downwardly and, at most, a very slight component force thereof is oppositely directed to the force $F_s$ exhibited by spring means 84. If need be, the required magnitude of $F_s$, in the original calculations, can be increased as to compensate for such oppositely directed force component of float 60. Further, if there should be any fluid within chamber 40, the buoyant force thereof would be in the direction of creating a force component additive to the force, $F_s$, applied by spring means 84.

In both FIGS. 4 and 5 any force developed as a consequence of the weight of float 60 would be additive to the value of $F_s$ applied by spring means 84. Further, in FIG. 5, the weights of both lever arm 54 and valve member 70 would also be additive to the magnitude of $F_s$.

As with regard to FIG. 3, the magnitude of $F_s$ could also be increased, in the original calculations, as to compensate for any buoyant forces developing components opposite to the direction of $F_s$ when the invention is in the positions depicted in FIGS. 4 and 5, if such compensation is deemed necessary.

In any event, it should be apparent that the invention as herein disclosed and described, by employing relative weights and forces contrary to the teachings of the prior art, provides an arrangement whereby the undesirable draining of fuel is prevented as from an associated fuel tank during a crash or post-crash abnormal attitude.

It is, of course, apparent that the invention may be practiced by structure other than that specifically illustrated. For example, it is conceivable that instead of compression spring means 84 other types and forms of resilient means may be employed. It is also contemplated that other forms and/or configurations of lever arms 54 may be employed. Such variations and others will be apparent to those skilled in the art.

Although only a preferred embodiment of the invention has been disclosed and described it is apparent that other embodiments and modifications of the invention are possible within the scope of the appended claims.

I claim:

1. In a regulated liquid reservoir, the combination of a float regulated liquid inlet and safety shut off valve means, comprising housing means defining chamber means, passage means carried by said housing means and effective for conveying said liquid from a remotely situated source of said liquid to said chamber means, float means pivotally retained within said chamber means, said float means being positioned as to be acted upon by the attendant buoyant force of said liquid within said chamber means, valving means situated in cooperative relationship to said passage means and effective to regulate the rate of flow of said liquid from said passage means into said chamber means, said valving means being operatively connected to said float means as to thereby be openable and closeable in accordance with associated movement of said float means, and resilient means operatively connected to said float means, said resilient means exhibiting a preload force of a magnitude sufficient to cause and maintain closure of said valving whenever said liquid reservoir and said source are positioned in an attitude considered abnormal to the accepted mode of operation of said reservoir, said preload force being of a magnitude at least equal to a counter-force developed against said valving means by the pressure head of said liquid within said source during the said abnormal attitude thereof.

2. The combination according to claim 1 wherein said float means comprises a float member, and wherein said relilient means comprises spring means operatively connected to said float means in the vicinity of said float member.

3. The combination according to claim 1 wherein said float means comprises lever arm means secured for pivotal rotation within said chamber means and wherein said valving means is operatively connected to said lever arm means.

4. The combination according to claim 1 wherein said float means comprises lever arm means secured for pivotal rotation within said chamber means, wherein said arm means is operatively connected to said valving means, and wherein said resilient means comprises spring means continually resiliently urging said lever arm means and said valving means in a direction of closing of said valving means.

5. The combination according to claim 4 wherein said float means further comprises a float member, and wherein said float member is of a weight sufficient to prevent said spring means from by itself closing said valving means whenever said reservoir is in an operating position other than said abnormal attitude.

6. The combination according to claim 6 wherein during such operating position other than said abnormal attitude, said liquid within said chamber means provides a buoyant force sufficient in combination with the force of said spring means to close said valving means whenever the level of said liquid within said chamber means attains a predetermined selected level.

* * * * *

UNITED STATES PATENT OFFICE
CERTIFICATE OF CORRECTION

Patent No. 3,955,641      Dated May 11, 1976

Inventor(s) Marion L. Smitley

It is certified that error appears in the above-identified patent and that said Letters Patent are hereby corrected as shown below:

Claim 6 should read as follows:

6. The combination according to claim 5 wherein during such operating position other than said abnormal attitude, said liquid within said chamber means provides a buoyant force sufficient in combination with the force of said spring means to close said valving means whenever the level of said liquid within said chamber means attains a predetermined selected level.

Signed and Sealed this

Third Day of August 1976

[SEAL]

Attest:

RUTH C. MASON  
*Attesting Officer*

C. MARSHALL DANN  
*Commissioner of Patents and Trademarks*